United States Patent [19]
Koksbang et al.

[11] Patent Number: 5,656,394
[45] Date of Patent: Aug. 12, 1997

[54] ELECTRODES FOR RECHARGEABLE LITHIUM BATTERIES

[75] Inventors: Rene Koksbang, San Jose, Calif.; Pia Tonder, Esbjerg, Germany

[73] Assignee: Valence Technology, Inc., Henderson, Nev.

[21] Appl. No.: 289,840

[22] Filed: Aug. 9, 1994

Related U.S. Application Data

[63] Continuation of Ser. No. 17,487, Feb. 12, 1993, abandoned.

[51] Int. Cl.$^6$ ................................................ H01M 4/02
[52] U.S. Cl. ............................................................. 429/218
[58] Field of Search ....................................... 429/194, 218, 429/232, 235

[56] References Cited

U.S. PATENT DOCUMENTS

| | | |
|---|---|---|
| 3,414,440 | 12/1968 | Moore et al. . |
| 4,517,265 | 5/1985 | Belanger . |
| 4,830,939 | 5/1989 | Lee et al. . |
| 4,959,281 | 9/1990 | Nishi et al. . |
| 4,983,476 | 1/1991 | Slane et al. . |
| 5,028,500 | 7/1991 | Fong et al. ............................... 421/194 |

FOREIGN PATENT DOCUMENTS

| | | |
|---|---|---|
| 0510236 | 10/1992 | European Pat. Off. . |
| 0517070 | 12/1992 | European Pat. Off. . |
| 63-264865 | 11/1988 | Japan . |
| 1186555 | 7/1989 | Japan . |
| 0328131 A2 | 8/1989 | Japan . |
| 0460617 A2 | 12/1991 | Japan . |
| 0497308 A2 | 8/1992 | Japan . |
| 04284375 | 10/1992 | Japan . |
| 0510236 A1 | 10/1992 | Japan . |
| 04363864 | 12/1992 | Japan . |
| 4267074 | 2/1993 | Japan . |
| 05314964 | 11/1993 | Japan . |

OTHER PUBLICATIONS

International Search Report Form PCT/ISA/210 Dated 17 Jun. 1994 and Mailed 4 Jul. 1994.

*Primary Examiner*—M. Nuzzolillo
*Attorney, Agent, or Firm*—Linda Deschere; Karen Perkins

[57] ABSTRACT

There is provided an electrochemical cell which has a non-metal negative electrode (anode on discharge). The anode is not a solid metal, is not metallic, and has no free metal. Rather, an amount of lithium ions are incorporated into the anode carbon-polymer structure. The anode of the invention has no more than a minor amount of lithium in a precharged or fully discharged state. The anode is used with lithium-containing cathodes (positive electrodes), preferably of the intercalation type. The anode of the invention is of a material which includes carbon, an electrolyte, and one or more constituents selected from the group consisting of metal and semi-metal elements and compounds and alloys thereof, other than lithium and its alloys. Such constituents are further characterized by an ability to react electrochemically with lithium by accepting and releasing lithium. Preferred metals and semi-metals include aluminum, boron and silicon, and compounds and alloys thereof, such as AlSi.

7 Claims, 1 Drawing Sheet

ELECTRODES FOR RECHARGEABLE LITHIUM BATTERIES

This is a continuation of application Ser. No. 08/017,487 filed on Feb. 12, 1993, now abandoned.

FIELD OF THE INVENTION

This invention relates to electrochemical batteries, and more particularly, to improved anodes (negative electrodes) for such batteries.

BACKGROUND OF THE INVENTION

Lithium batteries, with metallic lithium electrodes, have limited life-cycle due to the degradation of the metallic lithium electrodes. Lithium is attacked and/or passivated by electrolytes. This results in formation of lithium powder with a very high surface area at the interface between the metallic lithium and the electrolyte. The formation of high surface area lithium powder is undesirable because it reacts violently with moisture and air. In U.S. Pat. No. 4,517,265, Belanger et al have proposed an anode composition based on a mixture of plastic or elastomeric macromolecular material with ionic conduction, particles of an alloy of lithium, and particles of a lithium carbon compound. These anodes contain metallic lithium and alloys thereof. In U.S. Pat. No. 4,959,281, Nishi et al suggested a negative electrode (anode) which consists essentially of carbonaceous material. Since carbon is known to have a capacity lower than lithium and other metals, Nishi's anodes have relatively low capacity, as measured in ampere-hours per kilogram. Thus, although Nishi avoids problems encountered with metallic lithium, anodes having better performance in terms of capacity are desirable.

Therefore, what is needed is an improved anode which is an alternative to present metallic lithium anodes and which simultaneously fulfills the requirements of high reactivity, good charge rate capabilities, cycle life, low specific weight, stability, and low cost.

SUMMARY OF THE INVENTION

Accordingly, it is an object of the present invention to provide an improved electrochemical battery based on lithium which has improved charging and discharging cyclic characteristics, a large discharge capacity, and which maintains its integrity over a prolonged life-cycle as compared to presently used anodes. It is also an object of the present invention to provide anodes and batteries which can be manufactured economically.

According to one aspect of the invention, there is provided an electrochemical cell which has a negative electrode (anode on discharge) that does not contain metallic lithium. That is, no free metallic lithium is used in the active material of the anode. Rather than the solid lithium metal and metal particles of conventional anodes, the anode of the invention has no more than a minor amount of ionic lithium in a precharged or fully discharged state. The anode is used with lithium-containing cathodes (positive electrodes). The anode of the invention is of a material which includes carbon, an electrolyte, and one or more constituents selected from the group consisting of metal and semi-metal elements and compounds and alloys thereof, other than lithium and its alloys. Such constituents are further characterized by an ability to react electrochemically with lithium by accepting and releasing ionic lithium. Preferred metals and semi-metals include aluminum, boron and silicon, and compounds and alloys thereof, such as AlSi.

In one embodiment, such constituents are in powder form, that is, granulated or finely divided particles. Herein, such powder constituents selected from the group consisting of metal and semi-metal elements and compounds and alloys thereof, other than lithium and its alloys, will also be referred to simply as "powder". Preferably, the carbon is of coke, graphite, furnace black, acetylene black or the like, and in the form of micron size particles. Preferably, the carbon particles are intermingled with particles of the powder and formed into an electrode by combining with a binder/electrolyte.

In another embodiment, the metal or semi-metal element or compound or alloy thereof (constituent) is supported on internal and external surfaces of the carbon particles. This provides metallized carbon particles, where the metal or semi-metal constituent is carried on internal or external surfaces of the carbon particles. Such constituents are added by vapor deposition, electroplating, or electroless plating from a suitable solution containing a compound of the metal or semi-metal element constituent.

The additional advantage of applying the metal onto the carbon is related to the dispersion of the metal which is present in much smaller particles in this case, than in the case of a powder. The smaller the particle size of the metal or semi-metal constituent, the smaller is the detrimental effect of the metal volume change on the composite electrode structure. The metallized carbon may be fabricated into a sheet or felt using suitable matrix material such as a binder.

Electrodes are made by mixing a binder/electrolyte with the metallized carbon or carbon/powder particles. The binder/electrolyte composition may be a binder/electrolyte such as polymeric acrylates which are x-linked (cross-linked) by radiation curing or may be based on conventional polymer or plastic electrolyte/binder systems. After mixing, the resulting paste is coated onto a current collector, such as a nickel foil with a roughened surface, and the polymer content is polymerized, and x-linked by heat or radiation curing.

The negative electrodes (anodes during discharge) are used with Li-containing cathodes, preferably of the intercalation type, such as, $LiCoO_2$, $LiNiO_2$, $LiMn_2O_4$ and $Li_2Mn_4O_9$. Other suitable Li-containing cathodes may also be used. During use of the cell, Li+ ions are transferred to the negative electrode upon charging. During discharge, Li+ ions are transferred from the negative electrode (anode) to the positive electrode (cathode). Upon subsequent charge and discharge, the Li+ ions are transported between the electrodes. The Li+ ions transferred to the anode are releasably retained with the anode structure in a non-metallic state.

These and other objects, features and advantages will become apparent from the following description of the preferred embodiments, appended claims and accompanying drawings.

DETAILED DESCRIPTION OF THE PREFERRED EMBODIMENTS

Figure 1:
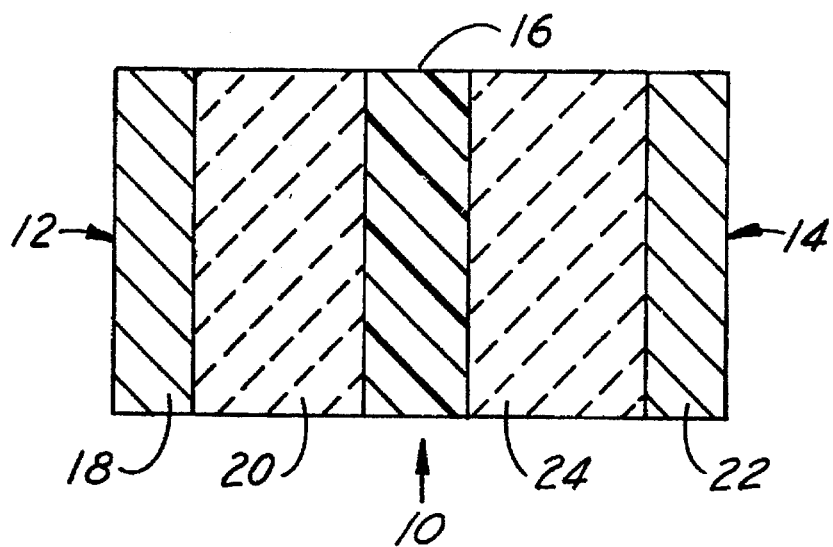
FIG. 1 is an illustration of a cross-section of a thin battery or cell embodying the invention.

An electrochemical cell or battery 10 has a negative electrode side 12, a positive electrode side 14, and a separator 16 therebetween. The negative electrode is the anode during discharge, and the positive electrode is the cathode during discharge. The negative electrode side includes a current collector 18, typically of nickel, iron, stainless steel, and copper foil, and a negative electrode material 20. The positive electrode side includes a current collector 22, typically of nickel, iron, stainless steel, and copper foil, and such foils having a protective conducting coating foil, and a positive electrode active material 24. The separator 16 is typically a solid electrolyte separator. Suitable electrolyte separators are described in U.S. Pat. No. 4,830,939.

According to one aspect of the invention, the material of the negative electrode (anode on discharge) includes carbon, an electrolyte, and one or more constituents selected from the group consisting of metal and semi-metal elements and compounds and alloys thereof, other than lithium and its alloys, which accept and release lithium ions. Preferred constituents include aluminum, boron and silicon, and compounds and alloys thereof, such as AlSi. Such constituents are in powder form, that is, granulated or finely divided particles. Herein, such powder constituents selected from the group consisting of metal and semi-metal elements and compounds and alloys thereof, other than lithium and its alloys, will also be referred to simply as "powder". Thus, the active material of the anode in the precharged state essentially comprises carbon and the powder.

In another embodiment, the metal or semi-metal element or compound or alloy thereof (constituent) is supported on internal and external surfaces of the carbon particles. This provides metallized carbon particles, where the carbon carries the metal or semi-metal constituent. Such constituents are added by vapor deposition, electroplating, or electroless plating from a suitable solution containing a compound of the metal or semi-metal element constituent.

The additional advantage of applying the metal onto the carbon is related to the dispersion of the metal which is present in much smaller particles in this case, than in the case of a powder. The smaller the particle size of the metal or semi-metal constituent, the smaller is the detrimental effect of the metal volume change on the composite electrode structure. The metallized carbon may be fabricated into a sheet or felt by mixing with suitable support material such as a binder.

Electrodes are made by mixing a binder/electrolyte with the metallized carbon or carbon/powder particles. The binder/electrolyte composition may be a binder/electrolyte such as polymeric acrylates (plastics) which are x-linked by radiation curing or may be based on conventional electrolyte/binder systems. The binder/electrolyte is preferably the polymeric acrylate (plastic) with ionic conduction capability. After mixing, the resulting paste is coated onto a current collector, such as a nickel foil with a roughened surface, and the polymer content is polymerized, and x-linked by heat or radiation curing.

It has been determined that the capacity of a carbon substrate having a small amount of such metal or semi-metal constituent is greatly improved. The capacity of carbon, aluminum, and silica are, respectively, 372 Ah/kg, 994 Ah/kg, and 957 Ah/kg. It has been found that these capacities alone are insufficient to predict improvement in capacity when some carbon is replaced by the powder because relatively small amounts of metal powder will have a significant positive influence on the anode capacity. The above described capacities assume one mole of lithium ion is accepted/released per mole of metal or semi-metal constituent. Silicon and other metals and alloys are able to take up more lithium and will, therefore, have higher capacities.

Any amount of metal or semi-metal constituent added to the carbon anode will improve performance. Generally, the anode of the invention comprises about 5 to 50 percent by weight carbon, and up to about 70 percent by weight of the anode is the metal or semi-metal powder (constituent). The balance is the polymerized binder/electrolyte (plastic). (Table 1.) Since the performance of the anode will be improved as any amount of carbon is replaced by the powder, there is no practical lower limit as to the amount of the metal or semi-metal constituent or powder so included so long as it is greater than none or zero. Preferably, the maximum amount of such metal or semi-metal constituent or powder is in a range of about 5 to about 70 percent by weight. On the basis of 100 parts by weight of metallized carbon, or combined carbon plus powder, the metallic portion constitutes greater than zero percent by weight and up to about 90 percent by weight; and conversely, the carbon constitutes less than 100 percent by weight and down to about 10 percent by weight. (Table 2.)

Crumbling of conventional metallic anodes is avoided by the new anodes of the invention. The invention provides a powder in relatively small amounts (compared to carbon) which minimizes this problem. The structure of the electrode consists of networks of polymer and carbon which is elastic and which accommodates volume changes when lithium ion is transported into the structure. This also reduces degradation of the anode. Furthermore, anodes of the invention are made essentially without free lithium so as to essentially eliminate problems with metallic lithium. Thus, the anodes are non-metal. The anode is not a solid metal, is not metallic, and has no free metal. Rather, an amount of lithium ions are incorporated into the anode carbon-polymer structure. Such anodes are suitable for use together with cathode materials which contain lithium, preferably intercalation cathode materials having lithium ions intercalated within the material. Examples of positive electrode (cathode) materials are $LiCoO_2$, $LiNiO_2$, $LiMn_2O_4$ and $Li_2Mn_4O_9$. A battery or cell formed according to the invention comprises a carbon-based anode substantially free of lithium, a electrolyte separator and a lithium-containing cathode. The carbon-based anode in a precharged state, or an essentially fully discharged state, has no more than a minor amount of lithium. Preferably, the electrolyte separator is a solid matrix containing an ionically conducting liquid with an alkali metal salt and the liquid is an aprotic polar solvent, as described in U.S. Pat. No. 4,830,939. Batteries made with this technology are, therefore, made in the discharged state and need a conditioning charge (pre-charge) before use. In the initial condition (pre-charged state), anodes of the invention are essentially free of lithium and ions thereof. Such batteries are, therefore, inherently more safe to ship because they do not experience shorting and the heat generated during shorting. For this same reason, such batteries are safer to manufacture.

During use of the cell, an initial charge transfers Li+ ions from the positive electrode (cathode) to the negative electrode (anode). During discharge, Li+ ions are transferred back to the positive electrode. Upon subsequent charge and discharge, the Li+ ions are transported between the electrodes. When the Li+ ions are taken into the anode structure, the Li+ ions occupy sites in the structure of the carbon particles and in the structure of the particles of metal or semi-metal powder. Thus, the Li+ is inserted in both the carbon and the metal powder. The manner in which insertion occurs depends on the voltages of the individual materials. Lithium ions will be inserted into the material with the highest voltage first. This also means that the lithium ions may be inserted in first one material, then a second material and then the first material again if the voltage of the second material drops below that of the first material.

When fully discharged, only a minor amount of the anode active material is constituted by lithium ions because the insertion is essentially reversible. Thus, only a minor amount of lithium is lost. Thus, when fully discharged, only a minor amount or less than 50% of the amount of Li+ at full-charge may remain in the carbon-based anode when fully discharged. The Li+ ions transferred to the anode are releasably retained within the anode structure in a non-metallic state. In principle, no free, metallic lithium is present in the anode ever, provided the electrode is not overloaded with lithium (balanced cells required) or lithium ions are transferred to the anode faster then they can diffuse into the electrode, in which case they will plate out as metallic lithium on the electrode surface. Fully discharged means that the battery has reached the lowest allowed voltage and in the fully discharged state, no lithium ions are present in the anode, at least in principle. It is expected that since the insertion of Li+ is essentially reversible close to zero Li+ is retained in the anode on discharge at relatively low current density. At higher current density, the retained Li+ is less than 35% of the amount present at full-charge. Thus, at most, less than 50% of the amount of Li+ present at full-charge is retained after discharge. As stated earlier, less than 50% corresponds to a minor amount being retained.

As stated, during use of the cell, an initial charge transfers lithium from the positive electrode (cathode) to the negative electrode (anode); during discharge lithium is transferred back again to the positive electrode. This activity continues upon subsequent charge and discharge. As further explained above, lithium is inserted in both the carbon and the metal of the anode structure. The constituents of the anode structure, which are characterized by an ability to react electrochemically with lithium by accepting and releasing lithium, remain in the anode structure in order to serve the function of accepting and releasing lithium. As stated, the invention uses lithium as the material which is transported between electrodes of the battery, because the tendency for an atom of lithium to release an electron and go to ionic form is greater than the tendency of the constituents to do the same. This occurs because the anode (negative electrode) comprises one or more constituents characterized by a potential less than the potential of lithium and by an ability to react electrochemically with lithium. Conversely, a material which has a greater potential to spontaneously release electrons than that of lithium, would not be suitable according to the invention as herein described. Further, the material must not have a potential equal to lithium as the invention is limited to those constituents having a potential less than lithium.

The invention will now be further illustrated by describing a basic method used for forming the anode. Then, the assembly of a test cell with anode, cathode and separator/electrolyte will be described.

The material constituting the negative electrode (anode on discharge) was prepared in the following manner. First carbon particles of furnace black or acetylene black were obtained. Such carbon is available from Conoco or Noury Chemical Corp.

The material may be a powder or in lumps. Irrespective of the form of the original material, the carbon was milled, usually together with the metal powder. This was done in order to 1) reduce particle size and 2) to mix the dry and solid components before the liquids are added. In an as-received condition, a typical carbon powder has particles of a size less than 100 microns, usually less than 10 microns, and often of micron or submicron size. For example, Ketjan Black has a BET surface area of about 900 m$^2$/gram and has an average particle size of about 10 to 100 nanometers (0.01 to 0.1 microns). Noury Chemical Corp. sells such carbon particles under the stated designation Ketjan Black. Milling may reduce such carbon particle size somewhat and also reduce the size of powder metal particles to less than 100 microns, desirably less than 10 microns, and preferably to micron or submicron size.

Similarly, metal powders of aluminum and silicon were purchased from i.e. Aldrich or other similar companies. Alloys such as AlSi are easily prepared from the elements. By way of example, anodes were prepared from a mixture having the consistency of a paste, and comprises about 150 grams of the carbon, about 23 grams of the powder and about 197 grams of polymeric acrylate (binder/electrolyte). The polymeric acrylate is a polyethylenically unsaturated compound including at least one heteroatom as described in U.S. Pat. No. 4,830,939. The paste was applied as a layer less than about 100 microns ($10^{-6}$ meters) thick on a nickel foil current collector. The polymeric acrylate was polymerized and cross-linked by electron beam radiation cross linking (generally referred to as EB curing) for pigmented coatings. Cross-linking by exposure to ultraviolet light is also possible but only if the mixtures are transparent as in the case of the electrolytes. Heat curing is also possible. The anode active material is carbon and one or more selected from metals, semi-metals, alloys and compounds thereof other than lithium.

Metals and semi-metals are capable of forming positive ions and are conductors of electricity. Conductivity of semi-metals is small, on the order of 10 to $10^{-5}$ ohm$^{-1}$·cm$^{-1}$. Metals have higher conductivities, generally greater than $10^4$ ohm$^{-1}$·cm$^{-1}$. Metals and semi-metals are found in the periodic table members of groups I and II, heavier elements of groups IIIB, IVB and VB, and transition elements occurring between groups IIA and IIIB. Metals and alloys thereof, such as aluminum, copper, boron, and AlSi are very suitable. Other examples include carbon/aluminum, carbon/silicon and carbon/AlSi. Table 1 shows some compositions, on the basis of percent by weight, as prepared and tested for carbon/aluminum. The Periodic Table contains elements arranged into 18 vertical columns which define the chemical families or groups. There are at least 3 designations commonly used to identify the columns. The old IUPAC recommendation designates the boron family as Group 3B, the carbon family as Group 4B and transition metals occurring between Groups 2A and 3B, the new IUPAC proposal as of 1985 designates boron family as Group 13, carbon family as Group 14 and transition metals between Groups 2 and 13;; the Chemical Abstracts Service (CAS) notation designates boron family as Group 3A(IIIA), carbon family as Group 4A(IVA) and transition metals between Groups 2A(IIA) and 3A(IIIA). The boron family includes aluminum, the carbon family includes silicon; and copper is representative of the transition metals.

TABLE 1

| Components | Percentage by Weight | | |
| --- | --- | --- | --- |
| | Example 1 | Example 2 | Example 3 |
| Carbon | 40 | 10 | 41 |
| Aluminum | 6 | 31 | 6 |
| Binder | 54 | 59 | 53 |
| | 100 | 100 | 100 |

The compositions of Table 1, based on carbon and (metal) aluminum are given in Table 2.

TABLE 2

| Components | Percentage by Weight | | |
|---|---|---|---|
| | Example 1 | Example 2 | Example 3 |
| Carbon | 87 | 24 | 87 |
| Aluminum | 13 | 76 | 13 |
| | 100 | 100 | 100 |

A preferred positive electrode (cathode on discharge), for use with the anode of the invention, is prepared by applying a mixture of an intercalation compound and such as $LiCoO_2$, $LiNiO_2$, $LiNi_{1-x}Co_xO_2$, or compounds belonging to the Li-Mn-O system onto a current collector. The cathode and anode are placed on opposite sides of a separator/electrolyte, in a container, thus forming an electrode/electrolyte/electrode assembly or cell. To achieve a useable potential difference, the (positive electrode) is electrochemically oxidized, while the anode (negative electrode) is reduced. Thus, during charging, a quantity (x) of lithium ions (Li+) leave the positive electrode increasing its potential, and the Li ions are accepted at or intercalated into the carbon-based negative electrode which is reduced.

Carbon/aluminum electrodes (anodes) were prepared by the method of the invention and tested against comparative anodes based on carbon only. The counter electrode to the carbon/aluminum anodes was a lithium foil in these cells. Considering two electrodes (anodes), one based on carbon only and the other based on carbon and aluminum, the capacity of the cell based on carbon was 54.9 mAh, and the capacity of the carbon and aluminum cell was 66.5 mAh. The volume of the electrodes was identical, and the capacity increase by adding aluminum powder is thus more than 20%. These formulations are shown in Tables 1 and 2.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

We claim:

1. A rechargeable lithium battery with a negative electrode and a lithium-containing positive electrode; said negative electrode comprising: partially metallized carbon, said partially metallized carbon being partially metalized with one or more constituents characterized by an ability to react electrochemically with lithium by accepting and releasing lithium ions and selected from the group consisting of metal and semi-metal elements and compounds and alloys thereof other than lithium and compounds and alloys containing lithium, each of said constituents having a potential less than the potential of lithium; and an ionically conductive polymeric network providing a matrix for containing said metallized carbon.

2. The battery of claim 1, wherein each of said one or more constituents is selected from the group consisting of aluminum and its compounds and alloys, boron and its compounds and alloys, and silicon and its compounds and alloys, and mixtures thereof.

3. The battery of claim 1, wherein on a basis of 100 parts by weight of the combined amount of said carbon and said one or more constituents, said one or more constituents being present in an amount up to about 90 parts.

4. The battery of claim 1, wherein said carbon is in particle form and said one or more constituents is supported on internal and external surfaces of said carbon particles.

5. The battery of claim 1, wherein said carbon is in particle form and said one or more constituents are in the form of particles intermingled with said carbon particles.

6. The battery of claim 1, having said one or more constituents selected from the group consisting of Groups 3B (13) and 4B (14).

7. A negative electrode comprising:

a group of particles consisting essentially of partially metallized carbon, said partially metallized carbon consisting of carbon particles having disposed thereon one or more constituents characterized by an ability to react electrochemically with lithium by accepting and releasing lithium ions, said constituents being selected from the group consisting of non-lithium metal and semi-metal elements, and non-lithium-containing compounds and alloys thereof, each of said constituents having a potential less than the potential of lithium; and an ionically conductive polymeric network providing a matrix for containing said first group of particles having disposed thereon particles of said second group of particles.

* * * * *